United States Patent
Guenther et al.

(10) Patent No.: US 6,584,373 B1
(45) Date of Patent: Jun. 24, 2003

(54) METHOD FOR CONTROLLING A CNC MACHINE TOOL

(75) Inventors: Andreas Guenther, Bad Säckingen (DE); Ralph Aubert, Forch (CH)

(73) Assignee: Reishauer AG, Wallisellen (CH)

( * ) Notice: Subject to any disclaimer, the term of this patent is extended or adjusted under 35 U.S.C. 154(b) by 0 days.

(21) Appl. No.: 09/530,291

(22) PCT Filed: Oct. 22, 1998

(86) PCT No.: PCT/CH98/00452

§ 371 (c)(1),
(2), (4) Date: Apr. 27, 2000

(87) PCT Pub. No.: WO99/23542

PCT Pub. Date: May 14, 1999

(30) Foreign Application Priority Data

Oct. 31, 1997 (CH) .............................................. 2531/97

(51) Int. Cl.[7] ..................... G06F 19/00; G05B 19/4155
(52) U.S. Cl. ......................... 700/160; 700/87; 700/180; 700/181
(58) Field of Search .................. 700/86–88, 160, 700/164, 169, 172, 180, 181, 183

(56) References Cited

U.S. PATENT DOCUMENTS 5,189,624 A * 2/1993 Barlow et al. ............... 700/169
5,229,950 A * 7/1993 Niwa ........................... 700/181

FOREIGN PATENT DOCUMENTS

| DE | 43 30 220 | 3/1995 |
| EP | 0 553 621 A1 | 8/1993 |
| GB | 2 291 983 | 2/1996 |

* cited by examiner

*Primary Examiner*—Steven Garland
(74) *Attorney, Agent, or Firm*—Weingarten, Schurgin, Gagnebin & Lebovici LLP

(57) ABSTRACT

The invention relates to a control system of a CNC machine tool with cyclically recurring sequences. The control system has a data input and visualization unit, a machine check unit and a NC control unit with at least one stored NC program for generating movement sequences for the CNC machine. Functional data which are required for the machining of a specific work piece and which have been fed into the data input and visualization unit or selected in the unit are conveyed from the data input and visualization to the NC control unit. The machine check unit calls up function modules of the NC control program according to selected control data and by means of control codes, said function modules representing part programs, and proceeds from one function module to the next independently of its hierarchical position in the tree structure. In so doing, the machine check unit deactivates the hold commands in each function module by means of the control codes. The machine check unit takes into account the transition functions between individual function modules when switching from one function module unit to the next. The transition functions are necessary for physically initializing or loading the data for the CNC machine tool.

11 Claims, 4 Drawing Sheets

METHOD FOR CONTROLLING A CNC MACHINE TOOL

The present invention relates to a method for controlling a CNC machine tool, which has cyclically recurring sequences, according to the preamble of patent claim 1 as well as to a control system for a CNC machine, according to the preamble of patent claim 6.

Under control systems one understands the combination of mechanics, electronics and information technology, which in automatisation technology permits a working procedure to automatically take its course according to a predetermined program.

Todays state of such control systems is for example described in the textbook of Manfred Weck, "Werkzeugmaschinen, Fertigungssysteme", Volume 3.1, VDI publishing house Duesseldorf, 1995 as well as in Dubbel, "Taschenbuch für den Maschinenbau", 17th edition, Springer publishing house, Berlin 1995.

Generally the control system today is subdivided into three levels or units:

- a data input and visualisation unit, also called a man-machine interface (MMI) which permits or makes available the machine and operating data acquisition, the choice of the machine mode to be carried out, the order administration and the process visualisation,
- an adaption control unit acting as a central control unit, also called a SPS or PLC (programmable logic controller), with a control program which according to the state of the art obtains the entirety of directions and agreements for the signal processing,
- an NC control unit (NC=numeric control), in which function sequences in NC control programs are stored. These NC control programs contain geometric data concerning the path information, technological data such as cutting speed, advance, spindle rotational speed, as well as alter commands, such as tool exchange, the equipping and removal of parts. Recurring movement sequences are filed several times in the NC program in accordance with the recurrence.

Data inputted via the MMI unit for defining the subject to be manufactured are decoded in the NC control unit and are processed further separately according to geometric, technological data and switch commands. Switch commands are transmitted further to the SPS control unit, where they are linked to feedbacks of the machine tool and in accordance with the control program processed step by step, are converted into control commands which synchronise the membered NC program. Geometric and technological data, after the calling-up by way of the NC control unit, produce corresponding axes movement commands for the machine. NC units and SPS units for the puprose of process visualisation inform the actual machine status to the MMI unit.

An important demand of such control systems is that they must be as flexible as possible, so that changes in the mechanics of the CNC machine or in the input mask of the MMI do not require a complete new programming of the machine.

In order to permit an extension of the mechanics of the machine tool, thus the control system disclosed in EP-A-0 553 621 from the start has at its disposal at least two SPS modules, wherein the first SPS module assumes the machine control and the second SPS module is present as a reserve. In the case of a machine extension only the second SPS module needs to be provided with the new machine functions for the further machine movements which are coupled automatically to the first SPS module by the control system. A renewed programming or a replacement of the already present, programmed first SPS module is not necessary.

In EP-A-0 642 066 there is set the object of flexibilising the dialogue guidance, so that the man-machine interface (MMI) may be adapted to the amended requirements of the user in a simple way and manner. A dialogue-orientated programming system for producing control programs has at its disposal a data forwards-backwards access unit which separates each program set up in a programming system into the part control data "machine control data" and "dialogue control data" which are provided with linkage keys. The machine control data are deposited into a machine program memory and the dialogue control data into a background memory. Via the logic keys they may again be constituted into a control program and filed in the background memory.

The control systems of CNC machines according to the state of the art are generally designed to be able to control as many as possible and as varied as possible machine movements, so that they attempt to form the indeed rigid central control unit more flexible with their SPS modules. This however leads to complex control systems, which as previously may only be changed by qualified specialists.

There are however also machine tools which have a noticable cyclic characteristic. One example of such a type of machine tool is a gearwheel grinding machine. The movements which a machine with a cycled characteristic are to carry out are repeated cyclically. Furthermore for all subjects the same subject shapes are used. The differences in the control system which lead to differently shaped subjects lie only in the operating parameters or control data, not in the basic movement sequences which are defined by individual machining functions. Furthermore the sequences and the hierarchies of the individual machining functions are unambiguously fixed and do not change. The machining functions for themselves as well as their hierarchy amongst one another even with an extension or modification of the machine always remain the same, so that the SPS module of the central control unit accordingly must always transmit the same control commands to the CNC level.

SUMMARY OF THE INVENTION

It is the object of the present invention to provide a method for the control of such a CNC machine with a noticeable cyclic characteristic, in particular of a gearwheel grinding machine, as well as to provide a control system, which permit a simple changing of programs and by way of this a high flexibilisation.

This object is achieved by a method with the features of the patent claim 1 as well as a control system with the features of patent claim 6.

The invention is based in the recognition that with machines with cyclically recurring sequences the function control of the machine within the sequence does not change and thus the master-slave principle may be used. By way of this the hierarchies between the central control unit and the NC control unit may be fixed more unambiguously than with the known CNC control systems.

According to the invention the NC program consists of several part programs or function modules which contain individual machining functions and which in each case are provided with an automatically executed hold command. The individual function modules may be called up by way of control codes of the machine control unit, wherein independently of their hierarchical position in the NC program one may change from one function module into the next. The control codes are set by the MMI unit in a context-sensitive manner.

According to the invention data inputted via the MMI unit is separated into function data for the machining functions and into control data for the choice of the function modules, wherein the former is transfered to the NC control unit where in accordance with the NC control unit it is used in this. The control data is transfered to the machine control unit where in the form of control codes or target codes in a central control program they serve the selection of the function modules of the NC program.

This machine control unit replaces the known SPS control unit, since it assumes all exercises of the known SPS control unit. It is furthermore in the position of determining which function module should be run through next and thus assumes to a greater extent the effective control of the CNC machine. With this it fixes the path to be gone through within the program tree from the last activated function module to the new destination of the NC program, wherein the NC program may be run through in any direction. Thus not only does a hierarchical processing take place but also cycles interconnected within each other, a change to equal levels or jumping back to hierarchal higher planes are possible thanks to the machine control unit which by way of transition functions contained in the NC program, the physical preparation of the machine for carrying out the next machining function is ensured.

Since the individual function modules during a single sequence of the NC program may be called up several times, each processing function only needs to be carried out once in the NC program. The NC program according to the invention is thus simply constructed and does not unnecessarily require memory space.

According to the invention the function modules or menu points of an NC program are grouped together to a program tree. Which branch of the program tree is run through is determined by the machine control unit. Since it knows the linkage structure in the program tree it is furthermore in the position of determining the path from one branch to the next. Generally a single NC program is sufficient, the integration of several NC programs in a single NC control unit is however possible.

Thanks to the cooperation, according to the invention, of the MMI unit, the machine control unit and the NC unit, an existing control system may be changed or supplemented in a simple way and manner. If new machining functions are to be introduced, the integration of a new function module in the program tree as well as the placing of a new control code in the MMI unit are sufficient, these being transmitted to the machine control unit. If existing machining functions are to be provided with new control data then their placing in the MMI unit is sufficient. The user may thus carry out supplements and changes without having to change the central control program of the machine control unit. Examples for this are, a change of the data necessary for carrying out the machining procedures, the addition of new data, for example for a new machining tool or for a gearwheel with new dimensions or for carrying out new axis movements. With the changing or supplementing of the control thus not all of the interrelationships must be recognised since the tree structure of the NC program avoids false movements of the machine tool. The use of two primary files which may be copied in any manner, one for the control data and another for the function data, permit a quick and reliable addition of new control elements. Above all in the region of the MMI unit the change may be carried out without compiling by way of pure ASCII editing procedures.

Furthermore the MMI unit, in particular an operation and selection surface may be formed flexible and be changed in a simple way and manner without having to entail a change of the machine control unit.

Furthermore it is advantageous that by way of the control, according to the invention, of the NC program the danger of program call-ups leading to undesired interruptions of the subject machining procedure is avoided.

BRIEF DESCRIPTION OF THE DRAWINGS

In the accompanying drawings the control system according to the invention is shown schematically and in the subsequent description together with the method according to the invention is described in more detail. There are shown.

DETAILED DESCRIPTION

Figure 1:
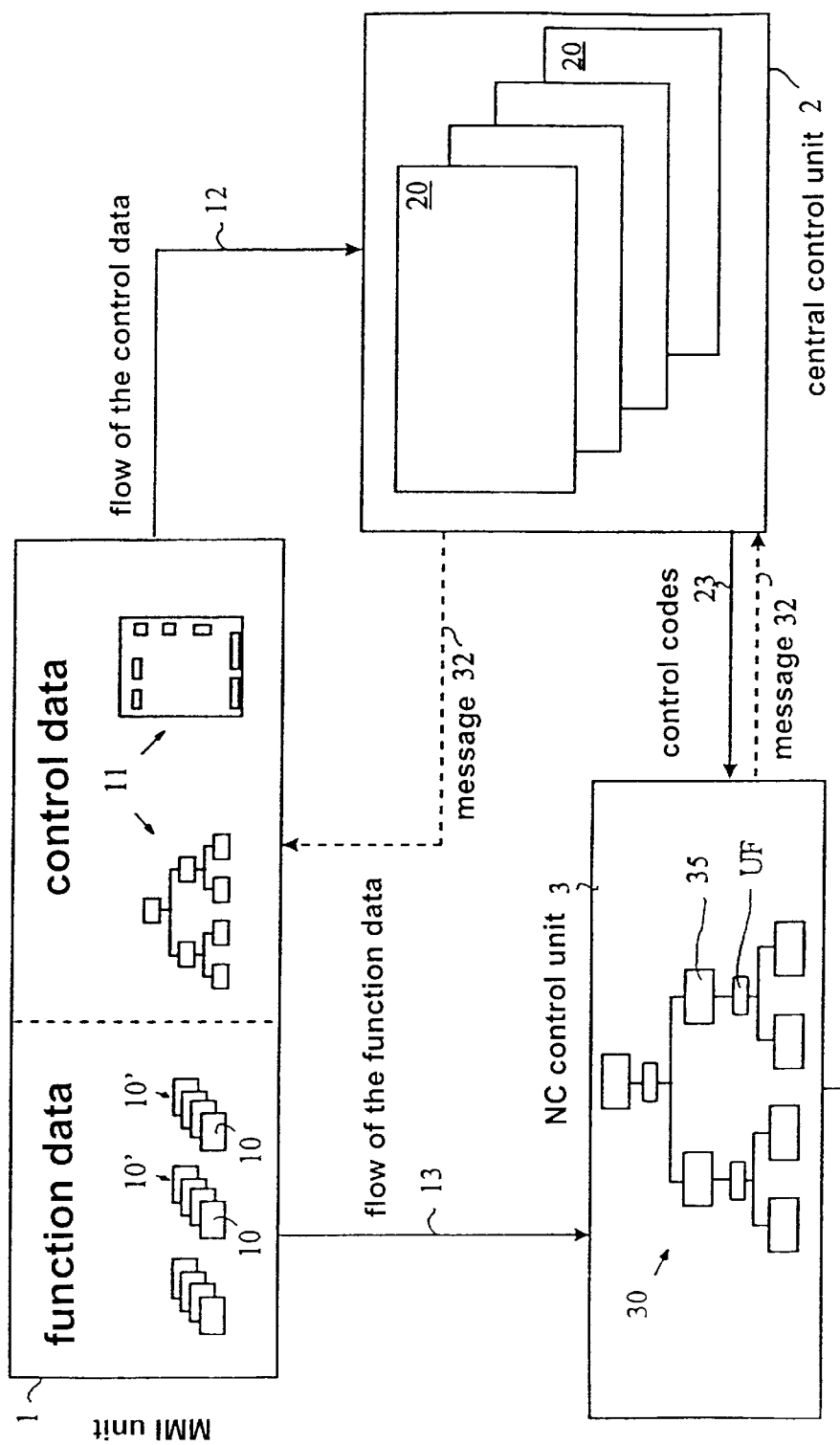
FIG. 1 a schematic representation of the units of the control system with a simplified detail of the data flow.

In FIG. 1 there is shown simplified the control system according to the invention for a gearwheel grinding machine, wherein auxiliary function controls and control mechanisms and enquiries which are not essential to the invention are not drawn in.

The control system consists essentially of three units: of a data input and visualisation unit, also called MMI unit 1, of a central control unit or machine control unit 2, and of a NC control unit 3.

The MMI unit 1 makes available to the user an operating and selection surface, in order to select or input operating parameters (control data 10) and machine mode (function data 11). This operating and selection surface may be formed in the form of a matrix (matrix-select-guide) or as is shown in FIG. 1, correspond to a tree (tree-select-guide). This tree may, but not necessarily, correspond at least approximately to the NC program structure. Preferably in the same MMI unit the matrix as well as the tree are offered, wherein the user in each step of the operating and selection surface may change from one variant to the next.

The MMI unit 1 contains at least two primary files, wherein a first primary file contains all method-characteristic data necessary for the complete NC functionality and a second primary file contains all data necessary for the data input. From both primary files any number of copies may be produced and each file may be edited for itself. To the first primary file there are linked the function data 10 necessary for the specific machining of a subject, to the second primary file there is linked the control data 11 defining the machining functions.

Figure 2:
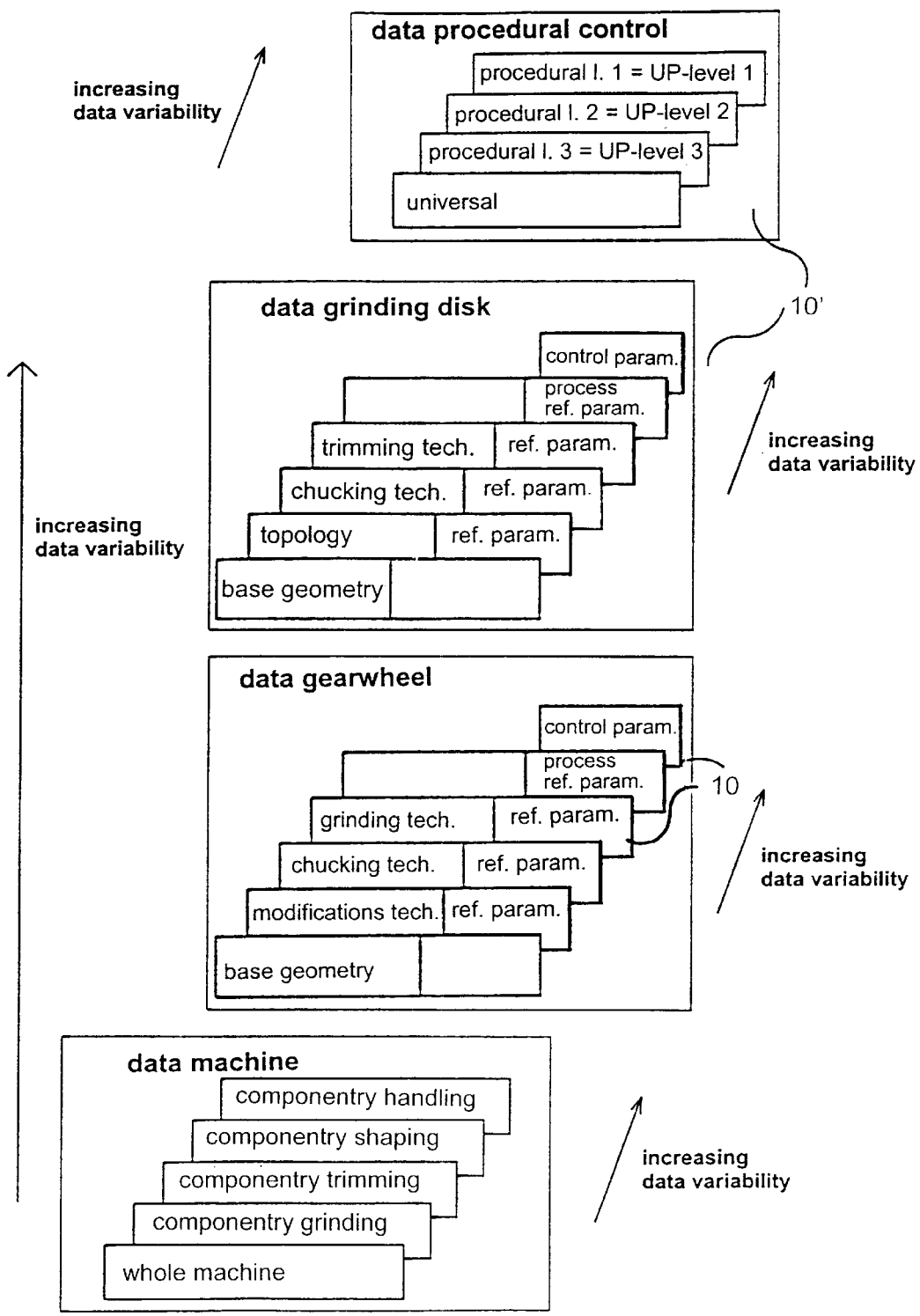
FIG. 2 a schematic representation of the data blocks in the MMI unit.

The function data 10 are preferably grouped together in data blocks 10' as this is schematically shown in FIG. 1. Each data block 10' comprises a part region of the CNC machine, for example as is shown in FIG. 2 there are present data blocks for the machine data, for tools to be used such as dressers or grinding disks, and for subjects to be manufactured such as gearwheels. The user selects from from existing, already stored data blocks or from generated data blocks with new details, for example for an additional gearwheel. Newly inputted data are subjected to a plausibility check.

The control data 11 serves the carrying out of various machine modes, such as profiling, grinding and diameter turning, wherein generally one may select between a mode for setting up the machine, a manual operation, a semi-automatic or an automatic operation. The control data 11 itself directly forms the control code necessary for the control of the NC program tree or may be unambiguously transmitted into this code.

The machine control unit 2 according to FIG. 1 consists of at least one, preferably several control modules 20 which in their function activation are constructed preferably hierarchical. For example an upper control module controls user sequences, the next lower control module concerns the periphery agreement and a next is responsible for the driver.

In the NC unit 3 there is stored at least one NC control program 30 for generating the machine movements. The NC control program 30 is preferably formed in the form of an NC program. It may however be formed by any type of non-interpretive program of the NC unit. The NC control program 30 comprises a tree structure which is described further below by way of FIGS. 3 and 4.

After the user in the MMI unit 1 has inputted or selected the function data 10 as well as the control data 11 for a specific machining procedure, the selected function data 10 is directly led (13) to the NC control unit 3 and the control data 11 transfered (12) to the machine control unit 2.

The control data 11 activate in the machine control unit 2 a central control program which in steps and in a cyclic succession passes on (23) control codes to the NC control unit 2. The control codes activate via code addresses individual function modules, of the NC unit 3, which are in active connection with the drive of the CNC machine and which activate the drives of the CNC machine. The NC control unit 3 furthermore before, during and after the machining process, with means not shown here, checks the machine status and leads this further (32) to the MMI unit 1 directly or via the machine control unit 2.

Figure 3:
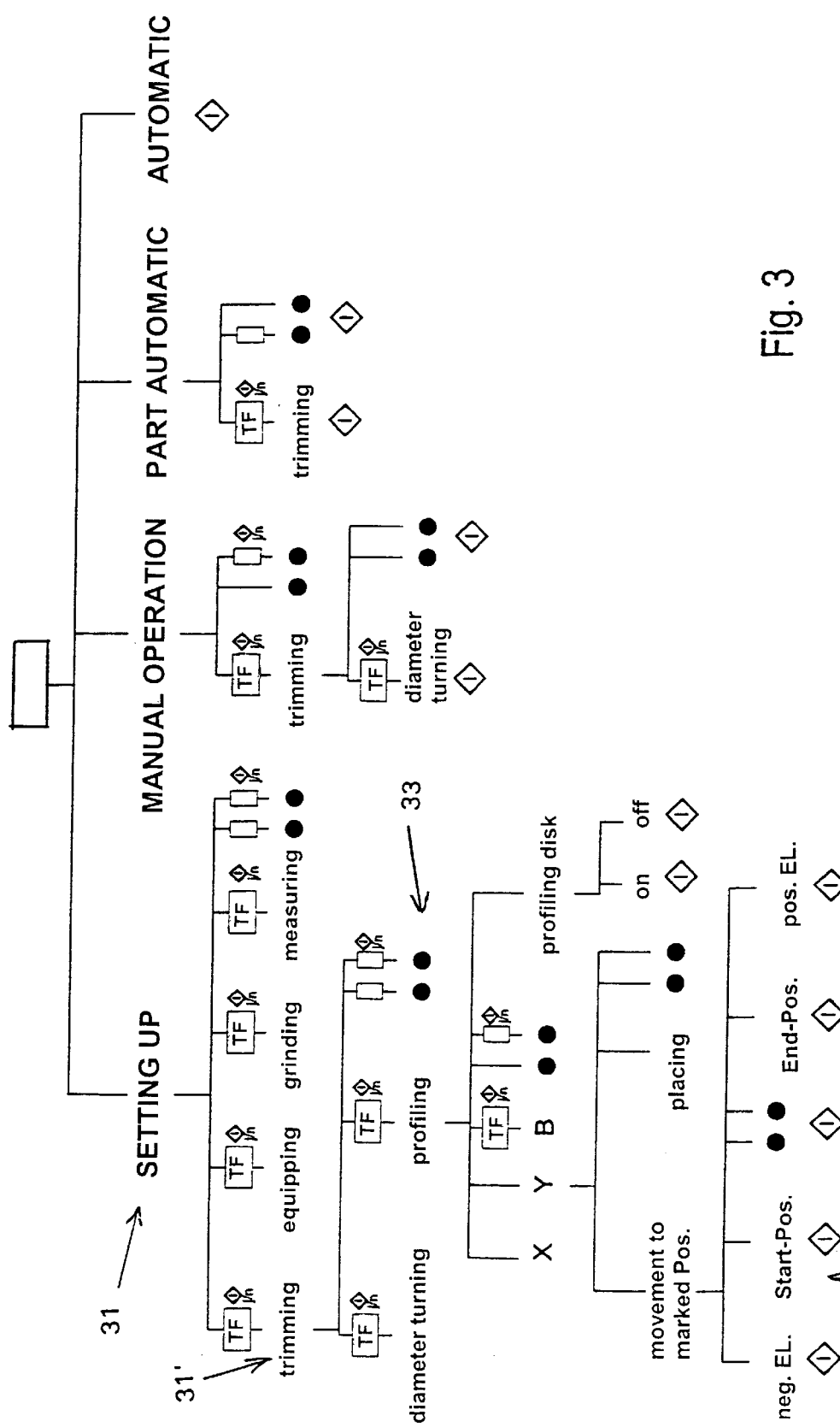
FIG. 3 a schematic representation of a program tree.

In FIG. 3 there is represented an NC program according to the invention in the form of a program tree. The uppermost branching-out of the tree differentiates the basic modes 31 of the gearwheel grinding machine, specifically the setting up, manual, part automatic and automatic operation. These basic modes may be separated also into separate NC programs. Each mode branches out in further planes which relate to certain machining types 31', such as dressing, equipping, grinding or measuring. At least one part of the machining types 31' in turn branches out into individual machining sub-types 33 such as diameter turning or profiling which via one or several further branching-outs end in the effective machine control commands 34. In the branching-outs there are present at least partly transition function modules TF. Such transition functions are for example procedure movements, trigonometric functions, algorithms, dialogues or switch functions.

Figure 4:
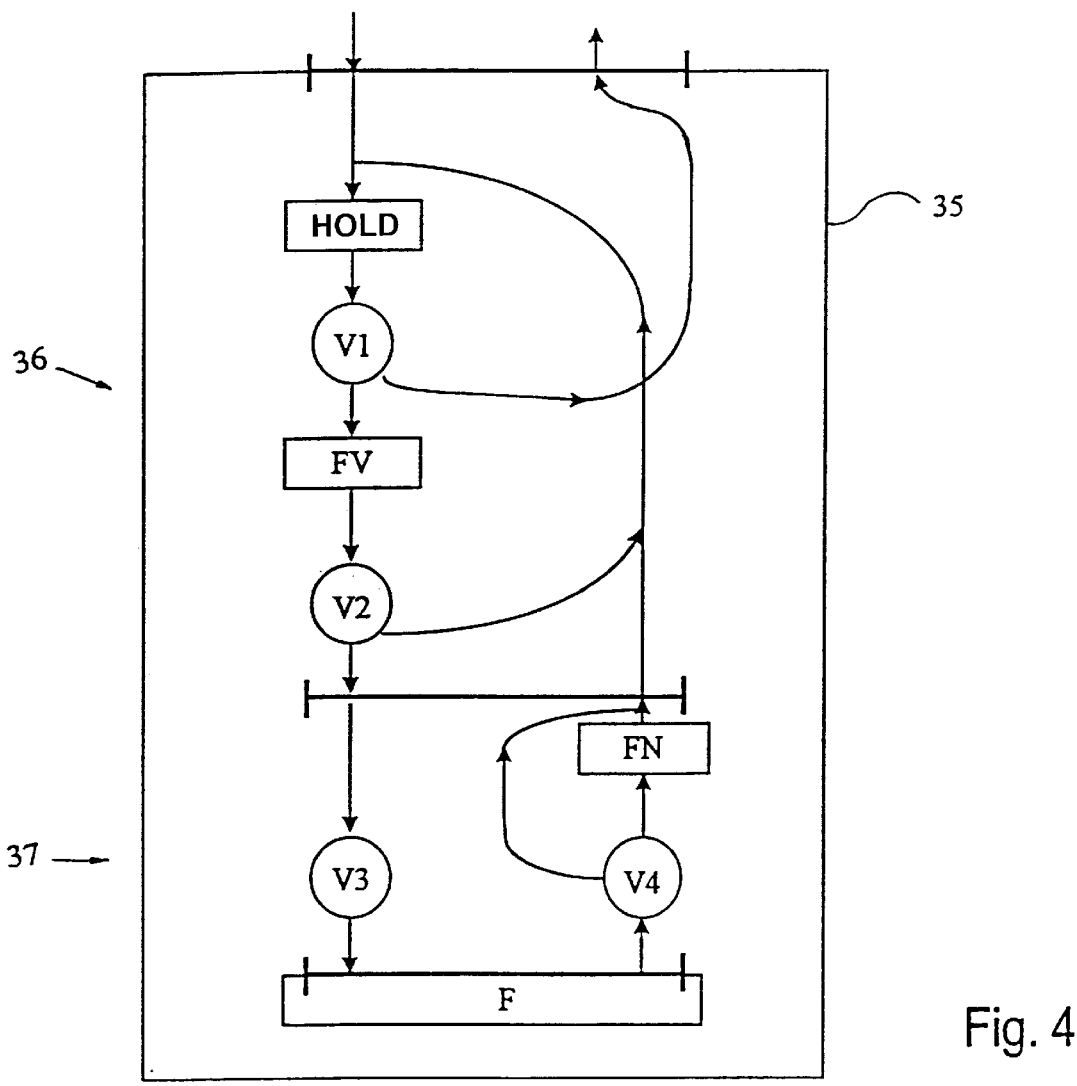
FIG. 4 a schematic representation of a function module.

Each level of the program tree 30 is essentially constructed identically and consists of one or more part programs or function modules 35. Such a function module 35 is shown in FIG. 4. It consists of a preparation part 36 and a subsequent execution part 37. At the beginning of the preparation part 36 there is a hold command H. Subsequently there follows a back-distributer V1 which selectively leads to the next higher level or hierarchically leads up to the function preparation FV. Subsequently there follows a function back-distributer V2 which in the case of an error notice E1 leads into the next higher level. Otherwise within the function module it is transmitted further into the execution part 37 where via a function distributor V3 a machining function F is called up, for example an axis movement from a point X to a point Y. After the execution of this function in the case of an error notice E2 there is effected a feedback via a function back-distributor V4 to the upper level. Otherwise the function back-distributor V4 initiates a retro-machining function FN, for example a lifting of a machining tool from the subject. The retro-machining function FN after completion returns to the hold command H.

Each function module 35 or its hold command H is provided with an identification number, also called target code. This target code is preferably selected such that each plane has at its disposal a number set and number sets of the next higher levels prefix this number set. For example the function "profiling" shown in FIG. 3 is provided with the target code "112". This target code in accordance with the user input in the MMI unit 1 via the machine control unit 2 is selected via the control code, the hold command is deactivated and the corresponding function module 35 is carried out. The target code and the control code are preferably identical.

The starting of such a function module 35 by way of a control code may be understood by the man skilled in the art and is therefore not described in detail in the following. Particular on the other hand is the changing from a function module 35 into another further module. This is effected after the selection of the target code via the MMI unit by way of a state machine which is integrated in the machine control unit and which is organised as a step chain, thus an NC dialog-capable automatic machine which recognises the linkage structure of the program tree. The machine control unit thus decides on account of the tree structure which transition functions TF must be necessarily carried out in order to physically convey the machine tool from the momentary position in the program tree up to the new start position for the new function module to be carried out. The transition function TF thus ensures that the machining tools are traversed to the desired position and the machine is prepared for carrying out the next operating function or ensures that the dialogues or computations necessary for the next action are carried out and the necessary data is prepared.

The transition functions may, as shown in the Figures, lie between the individual function modules. In other variants the transition functions are integrated in the function modules, for example in that they are integrated in the function preparation FV. Likewise it is possible that in a function module there are several function preparations FV as well as several retro-machining functions FN. For example a function preparation FV is arranged in front of the halt command and one subsequently after the halt command. In the same manner a first retro-machining function is run through in the case that the module is not left and a second retro-machining function in the case that the module is left.

We claim:
1. A method for controlling a CNC machine tool which has cyclically recurring sequences, in particular of a gearwheel grinding machine, with a data input and visualisation unit, with a machine control unit and with a NC control unit with at least one stored NC control program for generating movement commands for the CNC machine, wherein in the data input and visualisation unit selected control data defining machine modes are led further to the machine control unit, and wherein function data which is inputted into the data input and visualisation unit or is selected in this, and which is necessary for the machining of a specific subject, is led from the data input and visualisation unit to the NC control unit, characterised in that the machine control unit in accordance with selected control data by way of control codes calls up function modules, of the NC control program, representing part programs, and independently of their hierarchical position in the NC control program leads them from one function module to the next, wherein by way of the control codes hold commands (H) present in each function module are deactivated and wherein the machine control unit on changing from one function module to the next takes into account transition functions (TF) for the physical preparation and/or data preparation of the CNC machine tool.

2. A method according to claim 1, characterised in that after processing a function module one initialises a hold command (H) present at the beginning of each function module.

3. A method according to claim 2, characterised in that after processing a function module before initialising the hold command (H) a retro-machining function (FN) is called up.

4. A method according to claim 1, characterised in that in an activated function module at least one further function module interconnected therein is called up.

5. A method according to claim 1, characterised in that the function data is stored in the data input and visualisation unit by copying a first primary file and the control data by copying a second primary file.

6. A control system for a CNC machine tool which has cyclically recurring sequences, in particular for a gearwheel grinding machine, with a data input and visualisation unit for inputting or the selection of function data necessary for the machining of a specific subject and the control data defining the machine mode, with a machine control unit for controlling the CNC machine tool and with an NC control unit with at least one stored NC program for generating movement commands for the CNC machine, characterised in that the at least one NC program comprises a tree structure which is formed by several function modules representing part programs, that each function module is provided with a hold command (H) which in accordance with selected function data is deactivatable by way of control codes transmittable from the machine control unit, that each function module independently of its position in the tree structure can be called up by the machine control unit and that in the NC program between the function modules there are present at least partly transition functions (TF) for the physical preparation and/or data preparation of the CNC machine tool.

7. A control system according to claim 6, characterised in that the function modules have an identical structure.

8. A control system according to claim 7, characterised in that the hold command (H) is arranged at the beginning of the function module and that a loop from the end of the function module leads back into the hold command (H).

9. A control system according to claim 6, characterised in that on one branch of the tree structure there are present several function modules.

10. A control system according to claim 6, characterised in that the function data can be stored in copies of a first primary file and the control data in copies of a second primary file.

11. A control system according to claim 10, characterised in that the primary files have an ASCII format.

* * * * *

UNITED STATES PATENT AND TRADEMARK OFFICE
CERTIFICATE OF CORRECTION

PATENT NO. : 6,584,373 B1
DATED : June 24, 2003
INVENTOR(S) : Andreas Guenther et al.

It is certified that error appears in the above-identified patent and that said Letters Patent is hereby corrected as shown below:

Column 1,
Line 11, "automatisation" should read -- automization --.

Signed and Sealed this

Fifth Day of April, 2005

JON W. DUDAS
*Director of the United States Patent and Trademark Office*